March 10, 1970   A. H. JACOBSON   3,499,351
BORING BAR WITH MEANS TO REDUCE VIBRATIONS
Filed April 1, 1968

ALDEN H. JACOBSON
INVENTOR.

BY *Norman S. Blodgett*

3,499,351
BORING BAR WITH MEANS TO REDUCE
VIBRATIONS
Alden H. Jacobson, Princeton, Mass., assignor to The
Heald Machine Company, Worcester, Mass., a corporation of Delaware
Filed Apr. 1, 1968, Ser. No. 717,599
Int. Cl. B23b 29/04
U.S. Cl. 77—58     5 Claims

ABSTRACT OF THE DISCLOSURE

This invention has to do with a boring bar and, more particularly, to a machine tool apparatus in which unwanted vibrations are reduced to a minimum wherein the boring bar shaft extends from both sides of a mounting flange having the cutting tool mounted on one end of the shaft and a vibration damping means located at the other end of the shaft.

BACKGROUND OF THE INVENTION

In the operation of machine tools for the generation of a surface of revolution, it is common practice to mount a single point tool on the outer end of a boring bar. This bar is mounted on the end of a spindle which is rotated at high speed. Unfortunately, the fact that the cutting force is necessarily applied at the end of a rotating cantilever brings about a condition in which unwanted vibrations appear under certain circumstances. Such vibrations can cause poor finish on the workpiece surface and difficulties in maintaining cutting rates and geometry. These and other difficulties experienced with the prior art devices have been obviated in a novel manner by the present invention.

It is, therefore, an outstanding object of the invention to provide a boring bar in which unwanted vibrations are reduced to a minimum.

Another object of this invention is the provision of a boring bar with which the cutting action takes place without chatter.

A further object of the present invention is the provision of a boring bar capable of generating a surface of revolution with excellent finish.

SUMMARY OF THE INVENTION

In general, the present invention has to do with a boring bar having an elongated shaft adapted to carry a cutting tool at one end, having a diaphragm extending transversely of the shaft in the center portion thereof, the diaphragm being fixed on its periphery and connected in its central portion to the shaft, and having elastomer means located at the other end of the shaft for damping vibrations.

More specifically, the said other end of the shaft lies in a coaxial bore and is provided with a groove, and the damping means consists of an elastomer O-ring which lies in the groove and contacts the bore. The diaphragm is made very stiff relative to the tool end of the shaft and the masses and spring constants of the two halves of the shaft are selected so that the natural frequencies are the same.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
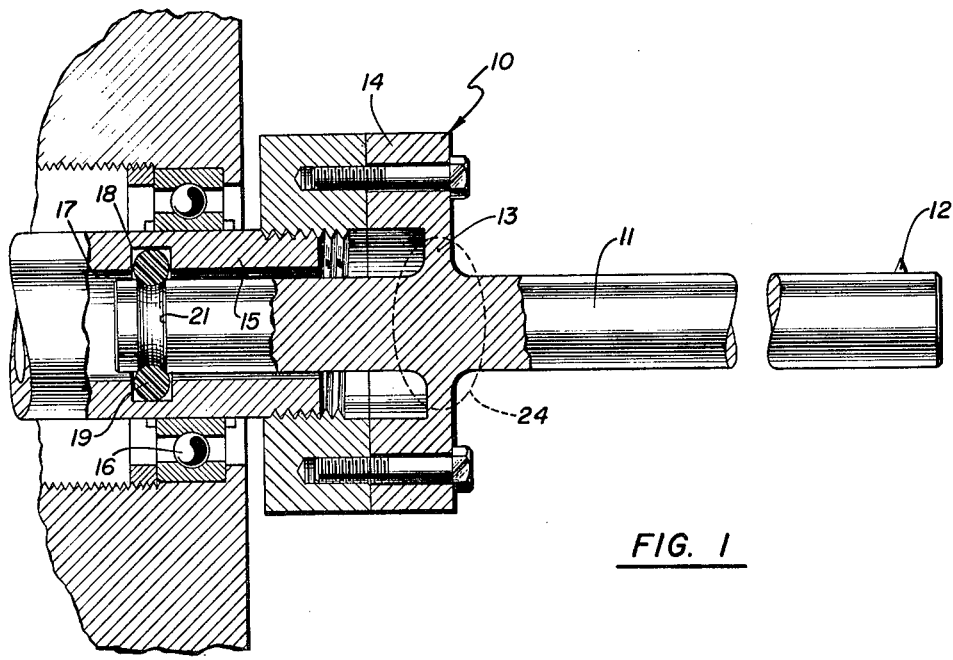
FIG. 1 is a sectional view of a boring bar incorporating the principles of the present invention.

Referring to FIG. 1, the boring bar, indicated generally by the reference numeral 10, is shown as having an elongated shaft 11 having a cutting tool 12 mounted at one end. From the center of the shaft extends a diaphragm 13 having at its periphery a relatively heavy rim 14 which is bolted to one end of a tubular spindle 15. The spindle is suitably mounted for high speed rotation in bearings 16.

The spindle is provided with an interior bore 17 having a groove 18 in which lies an elastomer O-ring 19. The ring lies in an annular groove 21 located near the end of the shaft opposite the end carrying the tool 12. The diameter of the bore 19 is only slightly larger than that of the surface of the shaft, thus defining between them a thin annular passage in which the O-ring lies.

Figure 2:
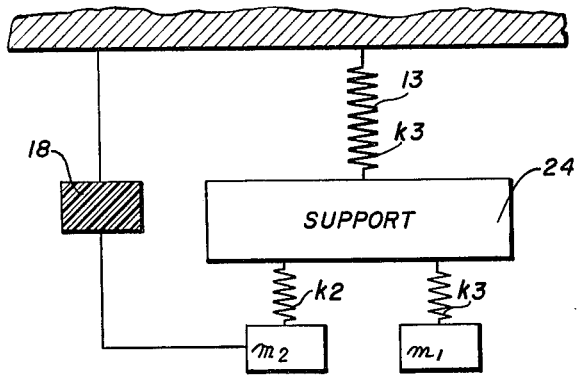
FIG. 2 is a schematic representation of the boring bar demonstrating the theoretical relationships in the system.

FIG. 2 shows the theoretical analytical relationship of the parts. Considering the connecting parts of the shaft as the SUPPORT 24 (indicated by the dotted line area in FIG. 1), the diaphragm 13 is indicated as a spring having a spring constant $k_3$. The mass $m_1$ of the tool end of the shaft is connected to the support by its spring constant $k_1$, while the mass $m_2$ of the other end of the shaft is suspended from the support by its spring constant $k_2$. The O-ring in the passage between the shaft and sleeve is represented by a rubber block. When the tool 12 is performing a cutting operation, vibrations may start in the tool end of the shaft; it acts as a cantilever about the support 24. The vibrations feed into the other end of the shaft. Since the frequency of either half of the shaft is defined by the equation:

$$f = \frac{1}{2\pi} \sqrt{\frac{k}{m}}$$

where $$k = \frac{3EI}{l^3}$$

Now, to make the natural frequencies of the two halves equal, it is necessary that $$\frac{1}{2\pi} \sqrt{\frac{k_1}{m_1}} = \frac{1}{2\pi} \sqrt{\frac{k_2}{m_2}}$$

or $$m_1 k_2 = m_2 k_1$$

When the diaphram 13 is selected with a stiffness or spring constant $k_3$ much larger than $k_1$ or $k_2$ (say, 10 times as large), the vibrations will feed from one mass to the other. The selection and adjustment of the O-ring 18, therefore, acts to inhibit the vibrations in the mass $m_2$ and this operates to dampen the vibrations in the tool end of the shaft.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A boring bar, comprising
   (a) an elongated shaft adapted to carry a cutting tool at one end,
   (b) a diaphragm extending transversely of the shaft in the center portion thereof, the diaphragm being fixed on its periphery and connected in its central portion to the shaft, and
   (c) elastomer means located at the other end of the shaft for damping vibrations.

2. A boring bar as recited in claim 1, wherein the said other end of the shaft lies in a bore and is provided with an annular groove and wherein the said means consists of an O-ring formed of an elastomer material extending between the groove and the bore.

3. A boring bar as recited in claim 1, wherein the product of the mass of the portion of the shaft on one side of the diaphragm and the spring constant of the portion of the shaft on the other side equals the product of the mass on the other side and the spring constant of the portion on the said one side.

4. A boring bar as recited in claim 1, wherein the spring constant of the diaphragm is in the order of ten times the spring constant of the portion of the shaft on the side of the diaphragm including the end adapted to carry the cutting tool.

5. A boring bar as recited in claim 1, wherein the diaphragm is integral with the shaft.

References Cited

UNITED STATES PATENTS 3,174,404   3/1965   Findley _____ 90—24

GERALD A. DOST, Primary Examiner